(12) United States Patent
Chu (10) Patent No.: US 12,145,688 B2
(45) Date of Patent: Nov. 19, 2024

(54) BICYCLE BRAKE LEVER

(71) Applicant: TEKTRO TECHNOLOGY CORPORATION, Changhua County (TW)

(72) Inventor: En-Liang Chu, Changhua County (TW)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 411 days.

(21) Appl. No.: 17/842,019

(22) Filed: Jun. 16, 2022

(65) Prior Publication Data

US 2022/0402573 A1 Dec. 22, 2022

(30) Foreign Application Priority Data

Jun. 16, 2021 (TW) .................................. 110121995

(51) Int. Cl.
*B62L 3/02* (2006.01)
*B62K 23/06* (2006.01)

(52) U.S. Cl.
CPC .............. *B62L 3/023* (2013.01); *B62K 23/06* (2013.01)

(58) Field of Classification Search
None
See application file for complete search history.

(56) References Cited

U.S. PATENT DOCUMENTS

| | | | | |
|---|---|---|---|---|
| 7,204,350 | B2* | 4/2007 | Lumpkin | B62L 3/023 188/24.14 |
| 7,654,366 | B2* | 2/2010 | Matsushita | B62K 23/06 188/344 |
| 2008/0245632 | A1* | 10/2008 | Watarai | B62L 3/023 188/344 |
| 2017/0129567 | A1* | 5/2017 | Snead | B62K 23/06 |

FOREIGN PATENT DOCUMENTS

DE 102008018237 B4 * 7/2020 ............. B60T 11/18

OTHER PUBLICATIONS

DE-102008018237-B4—English Machine Translation (Year: 2020).*

* cited by examiner

*Primary Examiner* — Melanie Torres Williams
(74) *Attorney, Agent, or Firm* — Maschoff Brennan (57) ABSTRACT

A bicycle brake lever includes a main body, a brake assembly, and a valve. The main body includes a casing and a cover mounted on the casing. The casing has a storage chamber and a hydraulic chamber. The brake assembly includes a lever, a link, and a piston. The lever is pivotally disposed on the casing, the link connects the lever and the piston, the link is disposed through the cover, the piston is movably located in the hydraulic chamber and has an inner channel in fluid communication with the storage chamber. The valve is movably disposed on the casing. The valve is partially located in the hydraulic chamber. When the piston is moved from an initial position to a sealed position, the valve blocks the inner channel of the piston, such that the hydraulic chamber is not in fluid communication with the storage chamber.

17 Claims, 12 Drawing Sheets

BICYCLE BRAKE LEVER

CROSS-REFERENCE TO RELATED APPLICATIONS

This non-provisional application claims priority under 35 U.S.C. § 119(a) on Patent Application No(s). 110121995 filed in Taiwan, R.O.C. on Jun. 16, 2021, the entire contents of which are hereby incorporated by reference.

TECHNICAL FIELD

The disclosure relates to a brake lever, more particularly to a bicycle brake lever.

BACKGROUND

In general, during the pulling process of a lever of a bicycle brake lever, the piston is required to be moved a distance from an initial position to a sealed position for disconnecting a storage chamber from a hydraulic chamber. In the movement of the piston in this distance, the storage chamber is still in fluid communication with the hydraulic chamber, and thus oil pushed by the piston flows from the hydraulic chamber towards the storage chamber without activating a brake caliper, so there is no reaction force applied on the lever, which makes a user feel no resistance when pulling the lever. The above-described pulling stroke of the lever can be regarded as an idle stroke. Once the storage chamber is not in fluid communication with the hydraulic chamber, the oil is only capable of flowing out of the hydraulic chamber to the brake caliper but not flowing into the storage chamber. At this moment, the user may feel obvious resistance when pulling the lever due to the reaction force provided on the lever by the brake caliper, which changes the operating feeling of the lever; that is, after the lever has been pulled the idle stroke, the user can feel the change of the operating feeling of the lever.

Generally, a sealing ring is adopted to be mounted on the piston for disconnecting the storage chamber from the hydraulic chamber. When the sealing ring passes by a connection channel between the storage chamber and the hydraulic chamber, the sealing ring disconnects the storage chamber from the hydraulic chamber. However, the position of the sealing ring on the piston is fixed, and thus the distance between the initial position and the sealed position of the piston is unchangeable. Therefore, the idle stroke of the lever is unable to be adjusted.

Although there are some brake levers enabling the distance between the initial position and the sealed position of the piston adjustable in the present, those brake levers have complex structures, which increases manufacturing costs. Therefore, how to solve the aforementioned issue is one of the crucial topics in this field.

SUMMARY

The disclosure provides a bicycle brake lever having a simple structure configuration which allows users to adjust the idle stroke of the lever to meet their operational requirements.

One embodiment of the disclosure provides a bicycle brake lever. The bicycle brake lever includes a main body, a brake assembly, and a valve. The main body includes a casing and a cover. The casing has a storage chamber and a hydraulic chamber, the hydraulic chamber has a bottom surface, the cover is mounted on the casing, and the bottom surface of the hydraulic chamber faces the cover. The brake assembly includes a lever, a link, and a piston. The lever is pivotally disposed on the casing, two opposite ends of the link are respectively connected to the lever and the piston, the link is disposed through the cover, the piston is movably located in the hydraulic chamber so as to be movable between an initial position and a sealed position, and the piston has an inner channel in fluid communication with the storage chamber. The valve is movably disposed on the casing. The valve sticks out of the bottom surface so as to be partially located in the hydraulic chamber. When the piston is in the initial position, the hydraulic chamber is in fluid communication with the storage chamber via the inner channel of the piston. When the piston is in the sealed position, the valve blocks the inner channel of the piston, such that the hydraulic chamber is not in fluid communication with the storage chamber. The valve is movable relative to the main body so as to adjust a distance between the initial position and the sealed position of the piston.

Another embodiment of the disclosure provides a bicycle brake lever. The bicycle brake lever includes a main body, a brake assembly, a valve, and a knob. The main body has a storage chamber and a hydraulic chamber. The brake assembly includes a lever, a link, and a piston. The lever is pivotally disposed on the main body, two opposite ends of the link are respectively connected to the lever and the piston, the piston is movably located in the hydraulic chamber so as to be movable between an initial position and a sealed position, and the piston has an inner channel in fluid communication with the storage chamber. The valve is linearly and movably disposed on the main body and partially located in the hydraulic chamber. The knob is rotatably disposed on the main body and connected to the valve, wherein a rotation axis of the knob is parallel to a movement direction of the piston. When the piston is in the initial position, the hydraulic chamber is in fluid communication with the storage chamber via the inner channel of the piston. When the piston is in the sealed position, the valve blocks the inner channel of the piston, such that the hydraulic chamber is not in fluid communication with the storage chamber. The knob is rotatable relative to the main body so as to linearly move the valve to adjust a distance between the initial position and the sealed position of the piston.

Still another embodiment of the disclosure provides a bicycle brake lever. The bicycle brake lever includes a main body, a brake assembly, and a valve. The main body includes a casing and a cover. The casing has a storage chamber and a hydraulic chamber, the hydraulic chamber has a bottom surface, the cover is mounted on the casing, and the bottom surface of the hydraulic chamber faces the cover. The brake assembly includes a lever, a link, and a piston. The lever is pivotally disposed on the casing, two opposite ends of the link are respectively connected to the lever and the piston, the link is disposed through the cover, the piston is movably located in the hydraulic chamber so as to be movable between an initial position and a sealed position, and the piston has an inner channel in fluid communication with the storage chamber. The valve is disposed on the casing and having a guide portion located in the hydraulic chamber, wherein the piston is movable between the initial position and the sealed position via a guidance of the guide portion of the valve. When the piston is in the initial position, the hydraulic chamber is in fluid communication with the storage chamber via the inner channel of the piston. When the piston is in the sealed position, the valve blocks the inner channel of the piston, such that the hydraulic chamber is not in fluid communication with the storage chamber.

According to the bicycle brake levers as discussed in the above embodiments, since the valve is movably disposed on the casing and sticks out of the bottom surface of the hydraulic chamber so as to be partially located in the hydraulic chamber, or since the valve is rotatably and linearly movably disposed on the main body and has a portion located in the hydraulic chamber, and the rotation axis of the valve is parallel to the movement direction of the piston, the valve is movable relative to the main body so as to adjust the distance between the initial position and the sealed position of the piston. Therefore, the bicycle brake lever can have a simple structure configuration for allowing users to adjust the idle stroke of the lever to meet their requirements.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 1:
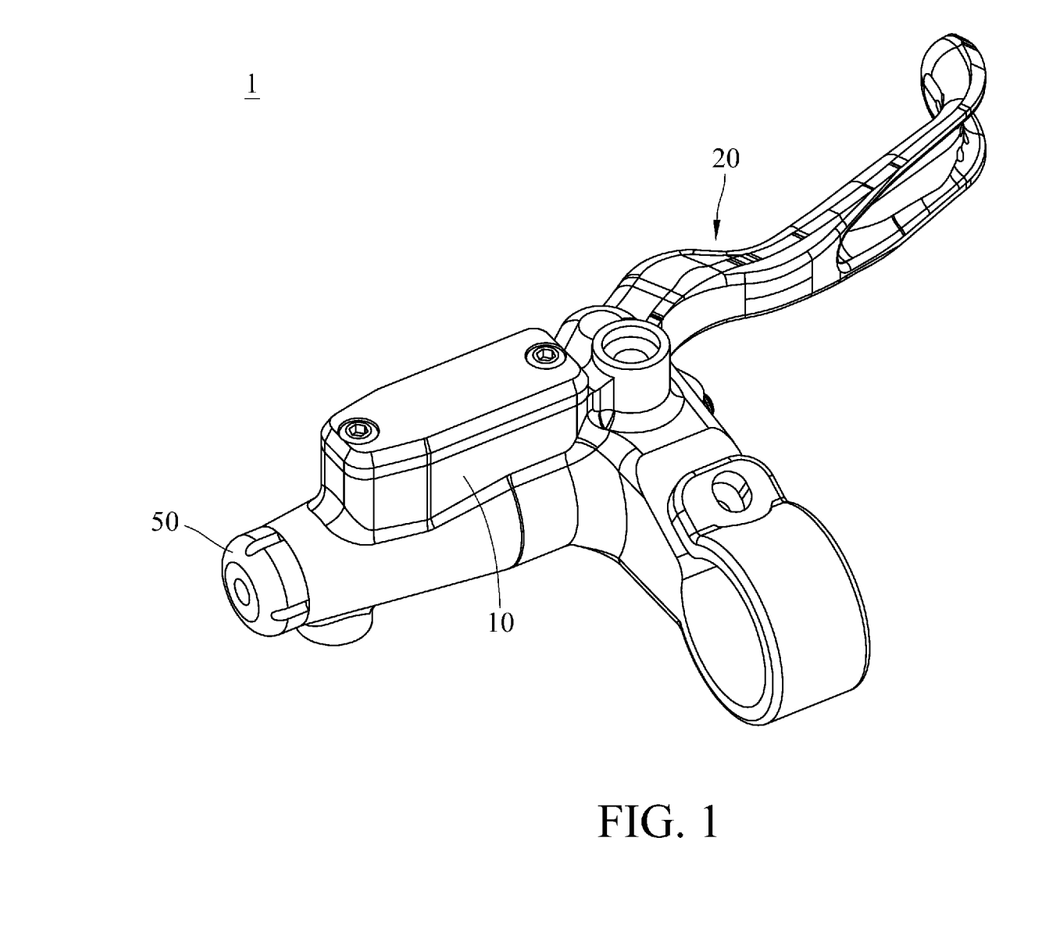
FIG. 1 is a perspective view of a bicycle brake lever according to a first embodiment of the disclosure.
Figure 2:
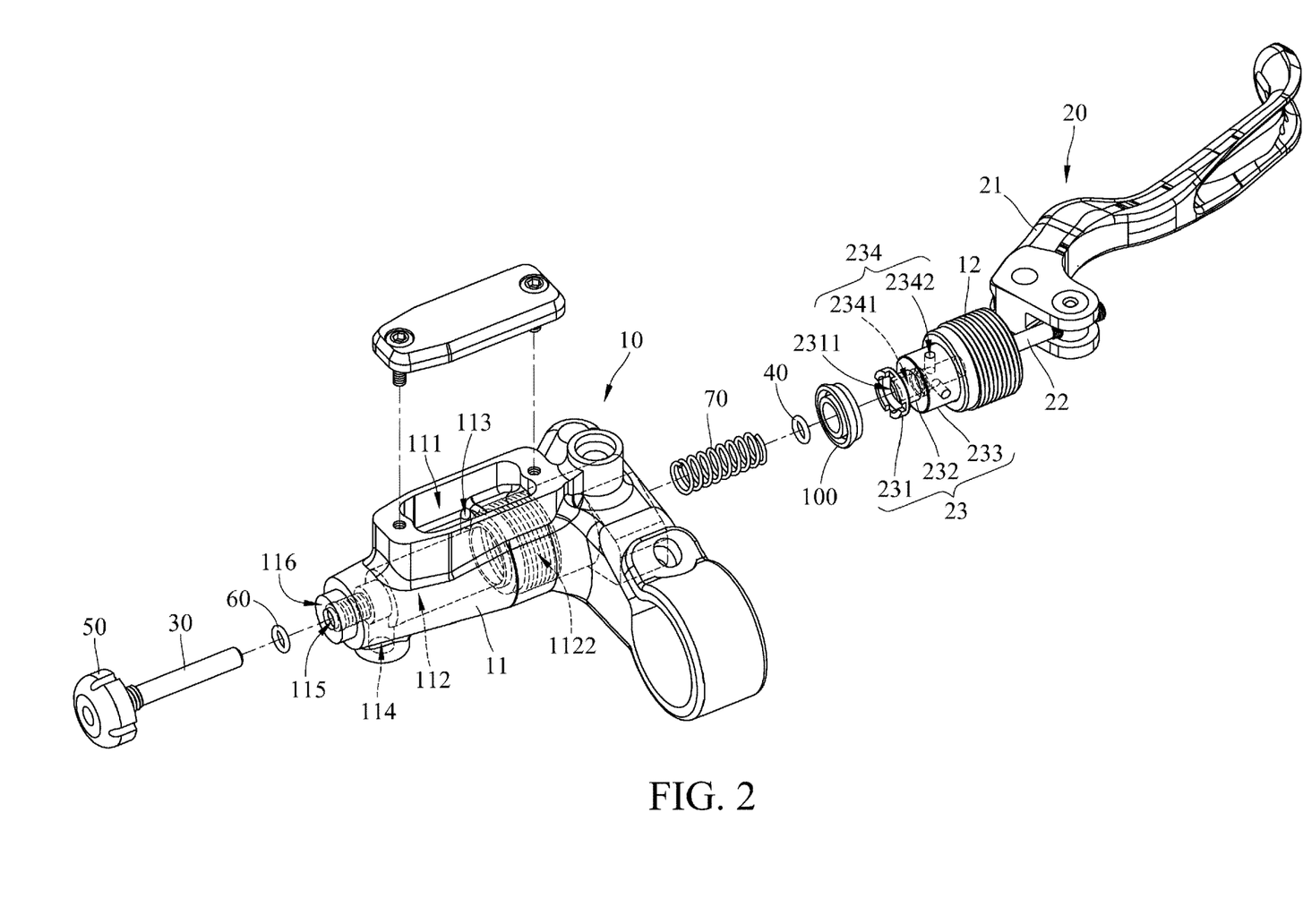
FIG. 2 is an exploded view of the bicycle brake lever in FIG. 1.
Figure 3:
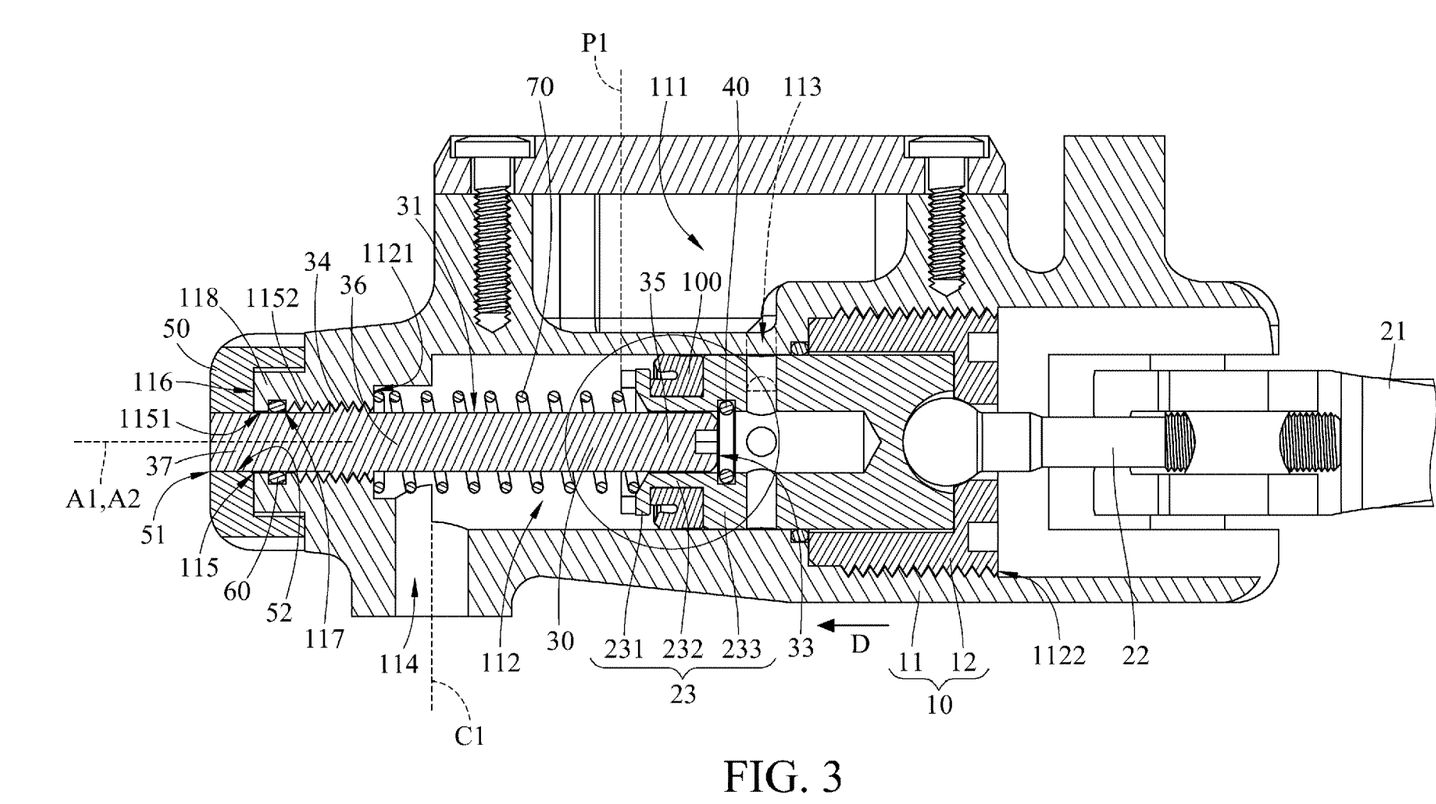
FIG. 3 is a partial cross-sectional view of the bicycle brake lever in FIG. 1.

Refer to FIGS. 1 to 3, where FIG. 1 is a perspective view of a bicycle brake lever 1 according to a first embodiment of the disclosure, FIG. 2 is an exploded view of the bicycle brake lever 1 in FIG. 1, and FIG. 3 is a partial cross-sectional view of the bicycle brake lever 1 in FIG. 1.

In this embodiment, the bicycle brake lever 1 is configured to be mounted on a handlebar (not shown) of a bicycle. The bicycle brake lever 1 includes a main body 10, a brake assembly 20, and a valve 30.

The main body 10 includes a casing 11 and a cover 12. The casing 11 has a storage chamber 111, a hydraulic chamber 112, a connection hole 113, an oil outlet 114, and a mount hole 115. The storage chamber 111 is connected to the hydraulic chamber 112 via the connection hole 113. The oil outlet 114 is in fluid communication with the hydraulic chamber 112. When the bicycle brake lever 1 is mount on the handlebar of the bicycle placed on the ground, the oil outlet 114 is located below the hydraulic chamber 112, and the storage chamber 111 is located above the hydraulic chamber 112; that is, in the case that the bicycle is placed on the ground, the oil outlet 114 is located closer to the ground than the hydraulic chamber 112, the oil outlet 114 extends towards the ground, and the storage chamber 111 is located farther away from the ground than the hydraulic chamber 112. The oil outlet 114 is configured to be connected to a brake caliper (not shown) via an oil pipe (not shown), and the caliper is, for example, configured to clamp a brake disk (not shown). The hydraulic chamber 112 has a bottom surface 1121 and an opening 1122. The bottom surface 1121 faces the opening 1122. The casing 11 further has an outer surface 116. The outer surface 116 faces away from the bottom surface 1121 of the hydraulic chamber 112. Two opposite ends of the mount hole 115 are respectively connected to the outer surface 116 of the casing 11 and the bottom surface 1121 of the hydraulic chamber 112. In other words, the mount hole 115 is a through hole penetrating through the casing 11. The inner surface 1151 of the mount hole 115 has a thread structure 1152. The cover 12 is mounted on the casing 11 via, for example, screws and located at the opening 1122 of the hydraulic chamber 112, and the bottom surface 1121 of the hydraulic chamber 112 faces the cover 12.

Figure 5:
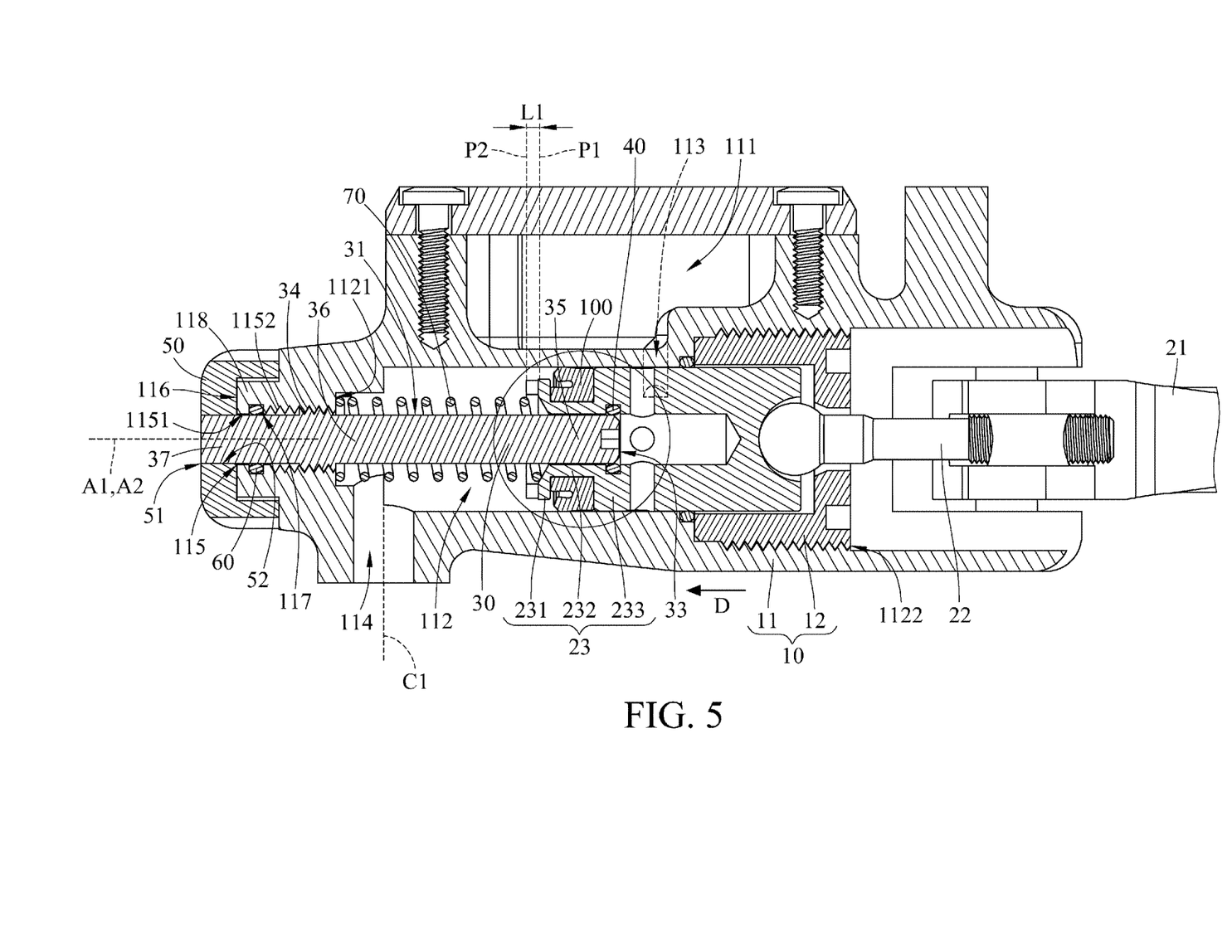
FIG. 5 is a partial cross-sectional view of the bicycle brake lever in FIG. 3 when a piston is in a sealed position.

The brake assembly 20 includes a lever 21, a link 22, and a piston 23. The lever 21 is pivotally disposed on the casing 11. One end of the link 22 is connected to the lever 21. The link 22 is disposed through the cover 12. The piston 23 is movably located in the hydraulic chamber 112. The piston 23 includes a head portion 231, a neck portion 232, and a body portion 233. A diameter D1 of the head portion 231 is greater than a diameter D2 of the neck portion 232 and smaller than a diameter D3 of the body portion 233. Two opposite sides of the neck portion 232 are respectively connected to the head portion 231 and the body portion 233, and the head portion 231 is located closer to the bottom surface 1121 of the hydraulic chamber 112 than the neck portion 232. Another end of the link 22 is connected to a side of the body portion 233 of the piston 23 located opposite to the neck portion 232. When the lever 21 is pulled, the lever 21 moves the piston 23 from an initial position P1 in a direction towards the bottom surface 1121 of the hydraulic chamber 112 to a sealed position P2 (as shown in FIG. 5) via the link 22; that is, the initial position P1 of the piston 23 is located farther away from the bottom surface 1121 of the hydraulic chamber 112 than the sealed position P2.

The head portion 231 of the piston 23 has a recess 2311, and the bottom surface 1121 of the hydraulic chamber 112 faces a bottom surface 2312 of the recess 2311. The piston 23 has an inner channel 234, and the inner channel 234 has a guide portion 2341 and a plurality of connection portions 2342 in fluid communication with each other. The guide portion 2341 is, for example, substantially perpendicular to the connection portions 2342. The guide portion 2341 extends from the bottom surface 2312 of the recess 2311 of the head portion 231 to the body portion 233 along an axial direction of the piston 23, and the connection portions 2342 are located at the body portion 233 of the piston 23 and extend from the guide portion 2341 to an annular surface 2331 of the body portion 233 along a radial direction of the piston 23. The guide portion 2341 is in fluid communication with the storage chamber 111 via the connection portions 2342 and the connection hole 113.

In this embodiment, the piston 23 includes the head portion 231, the neck portion 232, and the body portion 233 which are different in diameter, but the disclosure is not limited thereto; in some other embodiments, the piston may be a cylinder with a uniform diameter. Moreover, the guide portion 2341 is not restricted to being perpendicular to the connection portions 2342. In some other embodiments, the guide portion may be at an acute or obtuse angle to the connection portions. Furthermore, note that the quantity of the connection portions 2342 is not restricted in the disclosure and may be modified to be one in some other embodiments.

In this embodiment, the bicycle brake lever 1 may further include a sealing ring 40, and the piston 23 further has an annular recess 235. The annular recess 235 is recessed from an inner surface 23411 of the guide portion 2341 of the inner channel 234, and the annular recess 235 is located at the body portion 233 of the piston 23 and located closer to the neck portion 232 of the piston 23 than the connection portions 2342. Note that the annular recess 235 is not restricted to being located at the body portion 233 of the piston 23. In some other embodiments, the annular recess may be located at the neck portion or the head portion of the piston. The sealing ring 40 is disposed in the annular recess 235. The sealing ring 40 is, for example, an elastic and deformable ring which is, for example, made of rubber or another suitable material. The sealing ring 40 has an inner edge 41 and a through hole 42. The inner edge 41 is located in the through hole 42 and located at a position where a smallest inner diameter of the through hole 42 is located.

In this embodiment, the bicycle brake lever 1 may further include a sealing sleeve 100. The sealing sleeve 100 is, for example, an elastic and deformable annular U-shaped ring, which is, for example, made of rubber or another suitable material. The sealing sleeve 100 is sleeved on the neck portion 232 of the piston 23 and clamped between the neck portion 232 of the piston 23 and an annular inner surface of the hydraulic chamber 112, such that oil is unable to flow between the hydraulic chamber 112 and the storage chamber 111 through a gap between the body portion 233 of the piston 23 and the annular inner surface of the hydraulic chamber 112.

The valve 30, for example, has a shape as a post. The valve 30 has an outer annular surface 31, a tapered surface 32, an end surface 33, and a thread structure 34. The end surface 33 is located at an end of the valve 30, and the end surface 33 is connected to the outer annular surface 31 via the tapered surface 32. A diameter of the valve 30 gradually increase from one side of the tapered surface 32 located closer to the end surface 33 towards another side of the tapered surface 32 located closer to the outer annular surface 31; that is, the end of the valve 30 having the end surface 33 and the tapered surface 32 has a chamfer structure. A diameter D4 of the valve 30 at the end surface 33 is, for example, smaller than a diameter D6 of the inner edge 41 of the sealing ring 40 which is not deformed, and a diameter D5 of the valve 30 at the outer annular surface 31 is, for example, greater than or equal to the diameter D6 of the inner edge 41 of the sealing ring 40 which is not deformed. The thread structure 34 of the valve 30 is located at the outer annular surface 31. Specifically, the valve 30 has a guide portion 35 and a connection portion 36 connected to each other. The end surface 33, the tapered surface 32, and a part of the outer annular surface 31 are located at the guide portion 35, and another part of the outer annular surface 31 and the thread structure 34 are located at the connection portion 36. The thread structure 34 of the valve 30 is engaged with the thread structure 1152 of the inner surface 1151 of the mount hole 115. The connection portion 36 of the valve 30 sticks out of the bottom surface 1121 of the hydraulic chamber 112, a part of the connection portion 36 of the valve 30 is located in the hydraulic chamber 112 and located outside the guide portion 2341 of the inner channel 234, and the guide portion 35 of the valve 30 is inserted into the guide portion 2341 of the inner channel 234 of the piston 23, where the diameter D5 of the valve 30 at the outer annular surface 31 is, for example, smaller than a diameter D7 of the guide portion 2341 of the inner channel 234 of the piston 23.

In this embodiment, the bicycle brake lever 1 may further include a knob 50, and the valve 30 further has an extension portion 37. The extension portion 37 is located at a side of the connection portion 36 located opposite to the guide portion 35. The extension portion 37 of the valve 30 sticks out of the outer surface 116 of the casing 11, and the knob 50 is fixed to the extension portion 37 of the valve 30 via, for example, a tight-fit manner. Specifically, the knob 50 has a fixing hole 51, and the fixing hole 51 is recessed along a direction parallel to a rotation axis A2 of the knob 50. The extension portion 37 of the valve 30 is inserted into the fixing hole 51 of the knob 50, and the inner surface 52 of the fixing hole 51 of the knob 50 is in tight contact with the extension portion 37 of the valve 30, such that the knob 50 is fixed to the extension portion 37 of the valve 30. In addition, the casing 11 further has a protrusion portion 118. The outer surface 116 and a part of the mount hole 115 of the casing 11 are located at the protrusion portion 118. The knob 50 is rotatably sleeved on the protrusion portion 118 so as to be rotatable relative to the casing 11.

By rotating the knob 50 relative to the casing 11, the valve 30 can be rotated by the knob 50 so as to be moved linearly relative to the main body 10, where the rotation axis A2 of the knob 50 overlaps a rotation axis A1 of the valve 30, and the rotation axis A1 is parallel to a movement direction D of the piston 23. In addition, the rotation axis A2 of the knob 50 is perpendicular to a central line C1 of the oil outlet 114.

In this embodiment, the bicycle brake lever 1 may further include another sealing ring 60, and the casing 11 may further have an annular recess 117. The annular recess 117 of the casing 11 is recessed from the inner surface 1151 of the mount hole 115. The sealing ring 60 is disposed in the annular recess 117 of the casing 11 and clamped between a part of the casing 11 and the outer annular surface 31 of the valve 30 for preventing oil in the hydraulic chamber 112 from leaking from the mount hole 115.

In this embodiment, the bicycle brake lever 1 may further include an elastic component 70. The elastic component 70 is, for example, a compression spring. Two opposite ends of the elastic component 70 are respectively in contact with the bottom surface 1121 of the hydraulic chamber 112 and the bottom surface 2312 of the recess 2311 of the head portion 231 of the piston 23 so as to be partially located in the recess 2311 of the head portion 231 of the piston 23. The elastic component 70 is configured to force the piston 23 to move from the sealed position P2 towards the initial position P1.

Figure 6:
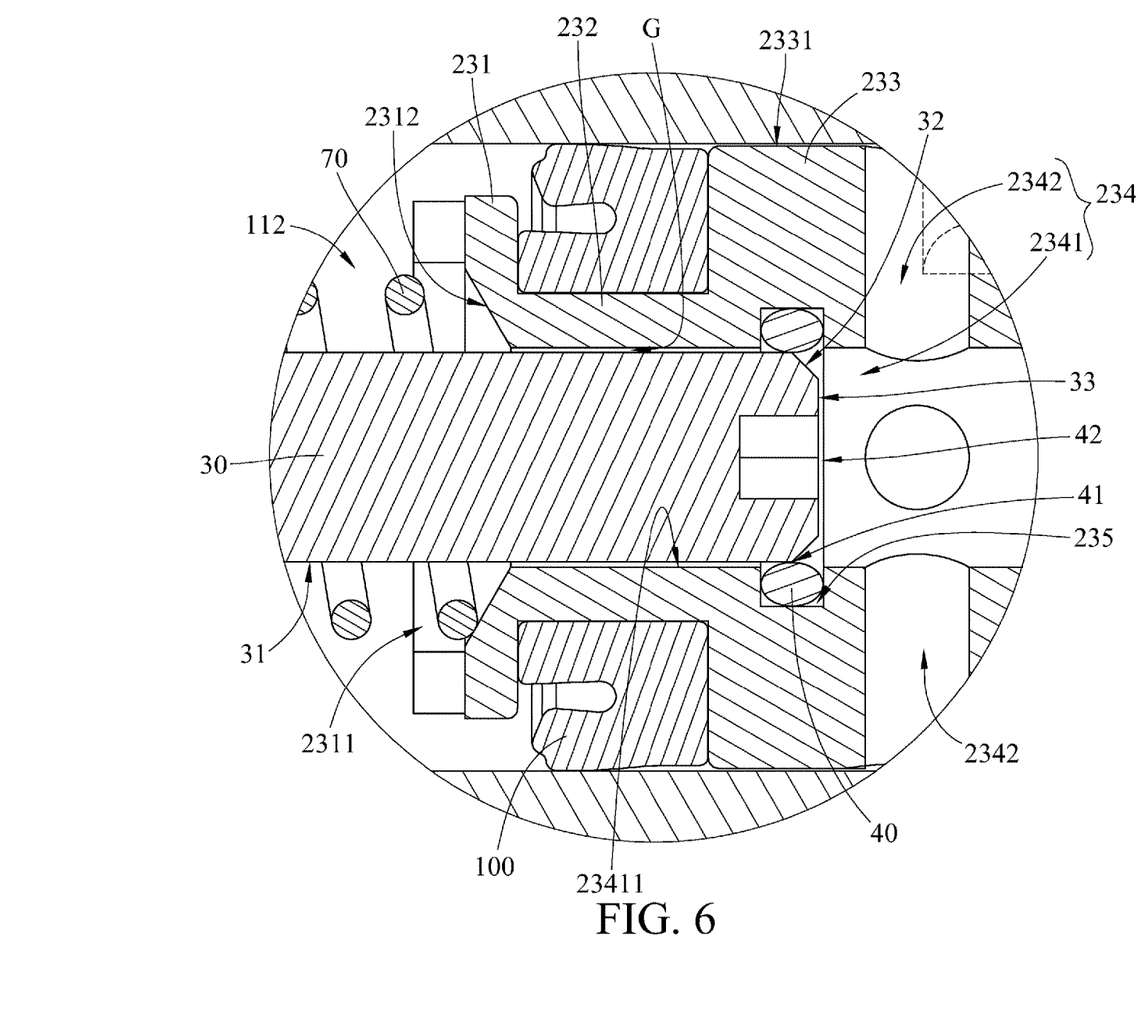
FIG. 6 is a partial and enlarged cross-sectional view of the bicycle brake lever in FIG. 5.

Then, refer to FIGS. 3 to 6, where FIG. 5 is a partial cross-sectional view of the bicycle brake lever 1 in FIG. 3 when the piston 23 is in the sealed position, and FIG. 6 is a partial and enlarged cross-sectional view of the bicycle brake lever 1 in FIG. 5.

Figure 4:
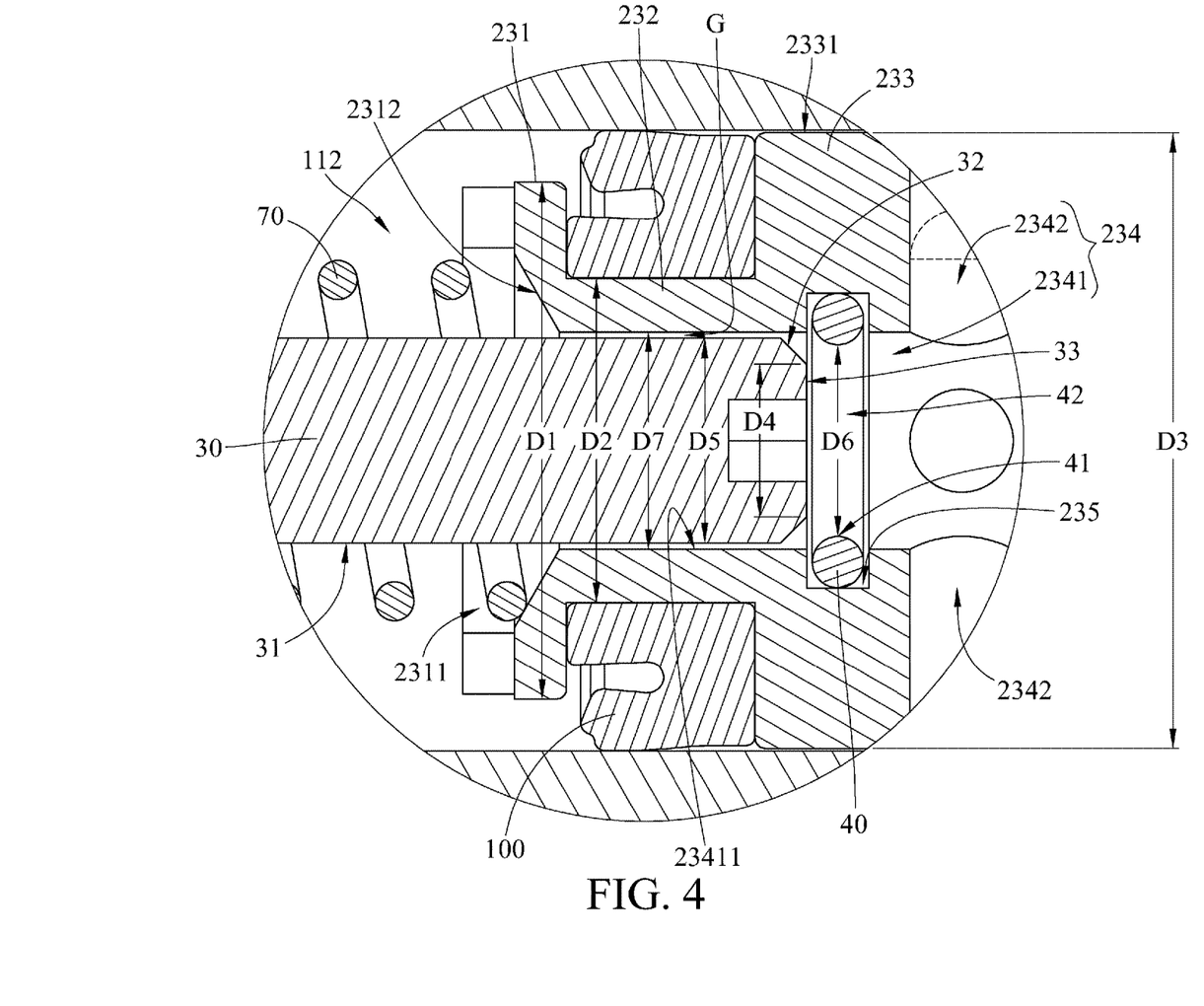
FIG. 4 is a partial and enlarged cross-sectional view of the bicycle brake lever in FIG. 3.

As shown in FIGS. 3 and 4, when the lever 21 is not pulled, the piston 23 is in the initial position P1. At this moment, the end (i.e., the guide portion 35) of the valve 30 having the tapered surface 32 and the end surface 33 does not enter into the through hole 42 of the sealing ring 40, and the end surface 33 of the valve 30 is located closer to the sealing ring 40 than the outer annular surface 31, such that the outer annular surface 31 of the valve 30 is separated from the sealing ring 40 so as to make the storage chamber 111 in fluid communication with the hydraulic chamber 112 via the connection hole 113, the connection portions 2342 of the piston 23 and a gap between the inner surface 23411 of the guide portion 2341 and the outer annular surface 31 of the valve 30.

By pulling the lever 21, the lever 21 moves the piston 23 to leave the initial position P1 via the link 22, such that the head portion 231 of the piston 23 and the bottom surface 1121 of the hydraulic chamber 112 compress the elastic component 70, and the end surface 33 and the tapered surface 32 of the valve 30 enter into the through hole 42 of the sealing ring 40. Before the outer annular surface 31 of the valve 30 contacts the sealing ring 40, the storage chamber 111 is still in fluid communication with the hydraulic chamber 112 via the connection hole 113, the connection portions 2342 of the piston 23 and the gap G between the inner surface 23411 of the guide portion 2341 and the outer annular surface 31 of the valve 30, such that oil pushed by the moving piston 23 flows into the storage chamber 111 from the hydraulic chamber 112 instead of entering into the oil pipe from the oil outlet 114. Therefore, the brake caliper is not activated, and there is no reaction force applied back to the lever 21. As a result, during the above-described pulling stroke (or the rotation angle) of the lever 21, there is nearly no resistance on pulling the lever 21, and the brake caliper is not activated. Accordingly, the aforementioned pulling stroke of the lever 21 can be regarded as an idle stroke.

Then, as shown in FIGS. 5 and 6, by continuing pulling the lever 21 to move the piston 23, the outer annular surface 31 of the valve 30 presses against and deforms the sealing ring 40, such that the sealing ring 40 is clamped between a part of the piston 23 and the outer annular surface 31 of the valve 30. At this moment, the piston 23 is in the sealed position P2, and the valve 30 blocks the guide portion 2341 of the inner channel 234 of the piston 23 (i.e., the gap G between the inner surface 23411 of the guide portion 2341 and the outer annular surface 31 of the valve 30), and thus the hydraulic chamber 112 is no longer in fluid communication with the storage chamber 111. Since the oil in the hydraulic chamber 112 can no longer flow into the storage chamber 111 but only able to flow towards the oil outlet 114, the piston 23 squeezes the oil out of the hydraulic chamber 112 from the oil outlet 114 during the pulling of the lever 21, and the oil flows through the oil pipe and enters into the brake caliper so as to activate the brake caliper for clamping the brake disk. Simultaneously, a reaction force generated when the brake caliper is activated is applied on the lever 21, so the lever 21 is required to be pulled much harder for moving the piston 23, and thus the operating feeling of pulling the lever 21 becomes different. Then, by continuing pulling the lever 21, the piston 23 is moved from the sealed position P2 towards the bottom surface 1121 of the hydraulic chamber 112 for keeping forcing the brake caliper to clamp the brake disk via the oil. When the lever 21 is released, the elastic component 70 forces the piston 23 back to the initial position P1.

Accordingly, during the whole pulling process of the lever 21, the lever 21 is firstly pulled in the idle stroke where the brake caliper will not be activated and there is nearly no resistance for moving the piston 23 from the initial position P1 to the sealed position P2, then the following pulling stroke of the lever 21 will activate the caliper and increase the resistance in pulling the lever 21 so as to change the operating feeling of pulling the lever 21.

Figure 7:
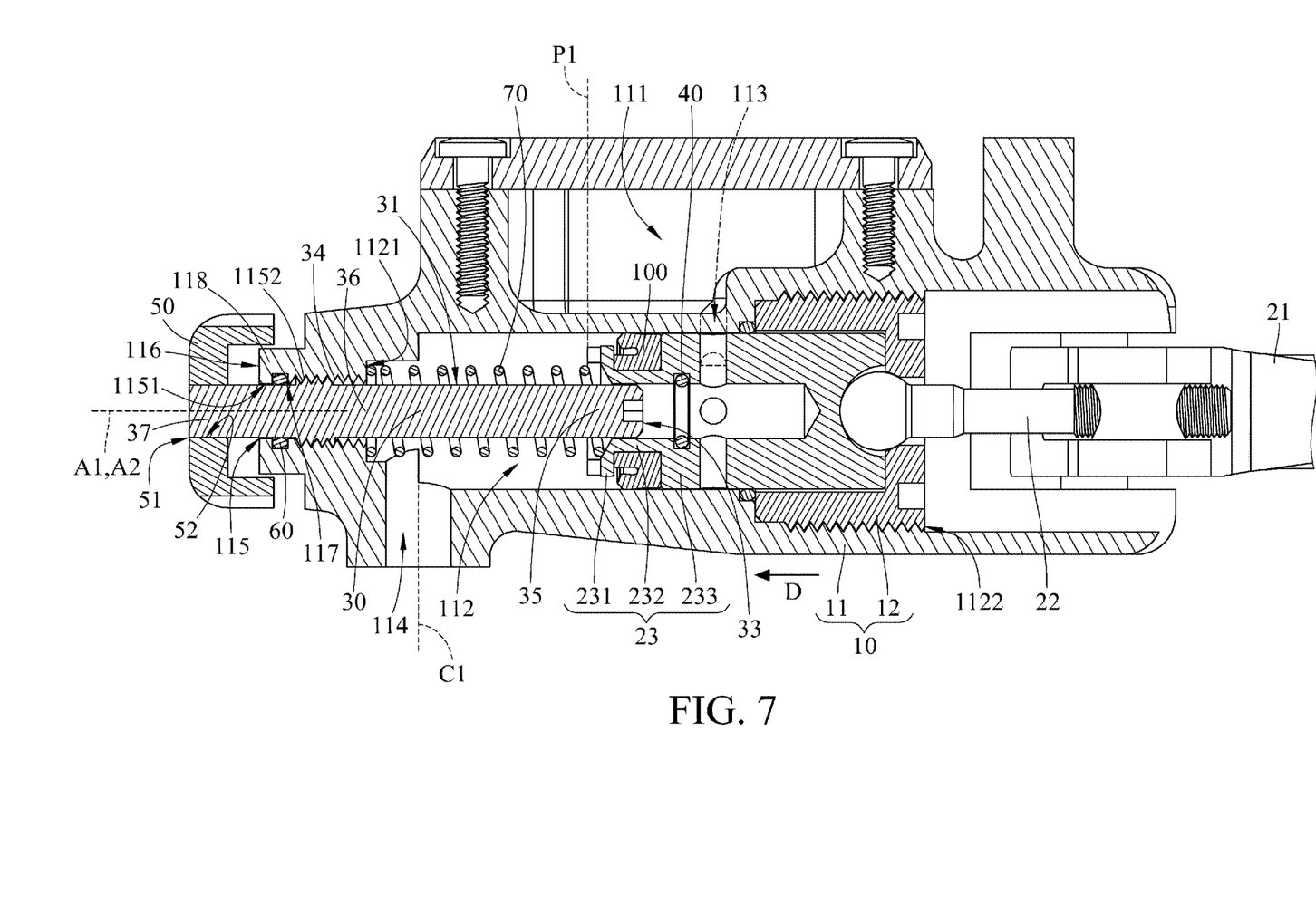
FIG. 7 is a partial cross-sectional view of the bicycle brake lever in FIG. 3 when a position of a valve has been adjusted.
Figure 8:
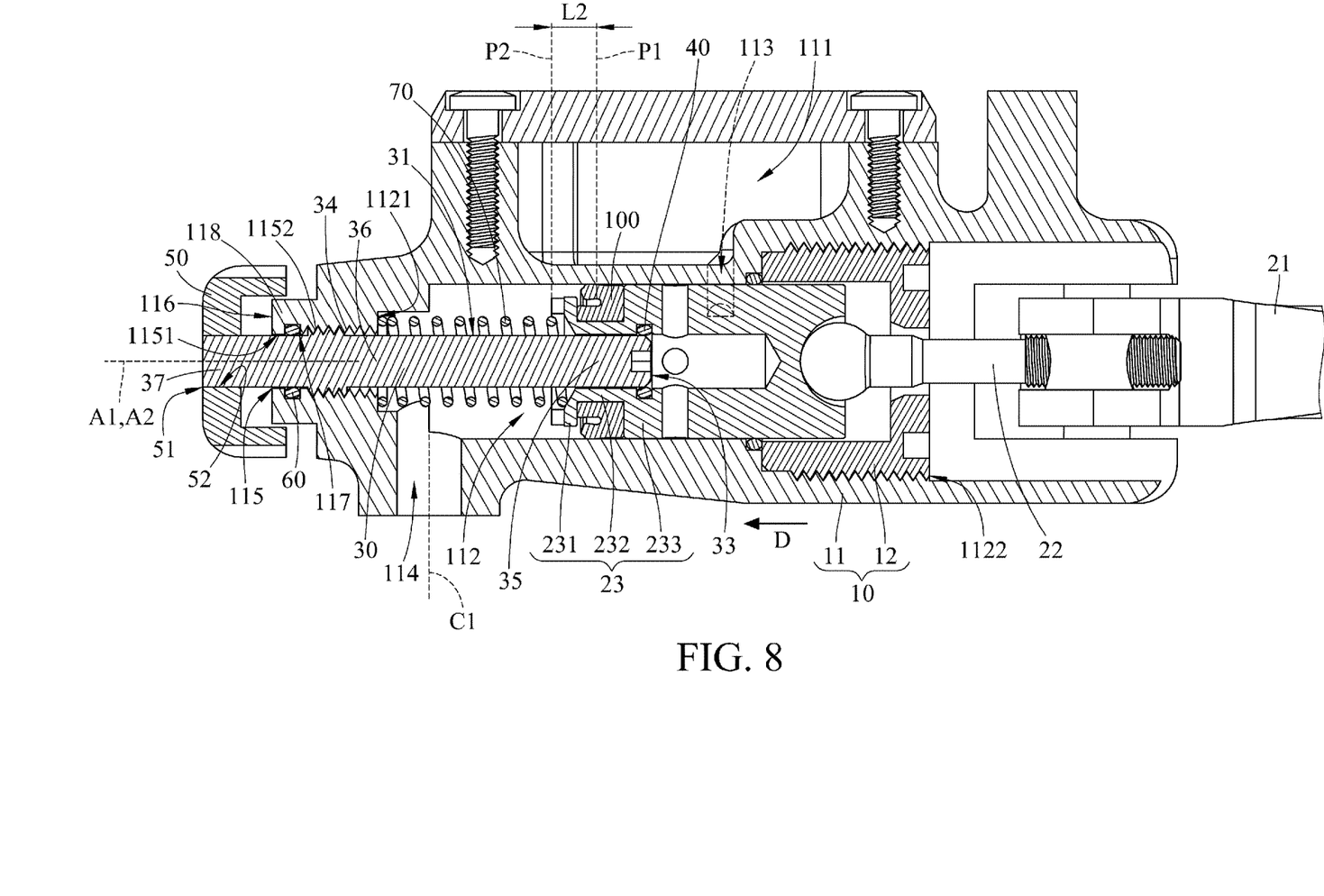
FIG. 8 is a partial cross-sectional view of the bicycle brake lever in FIG. 7 when the piston is in the sealed position.

Then, refer to FIGS. 7 and 8, FIG. 7 is a partial cross-sectional view of the bicycle brake lever 1 in FIG. 3 when a position of the valve 30 has been adjusted, and FIG. 8 is a partial cross-sectional view of the bicycle brake lever 1 in FIG. 7 when the piston 23 is in the sealed position. By rotating the knob 50, a distance between the initial position P1 and the sealed position P2 of the piston 23 can be adjusted; that is, the idle stroke of the lever 21 can be adjusted by rotating the knob 50. Specifically, by rotating the knob 50, the end surface 33 of the valve 30 can be moved towards the bottom surface 1121 of the hydraulic chamber 112 so as to be located farther away from the sealing ring 40 than the end surface 33 of the valve 30 shown in FIG. 3. At this moment, a distance L2 that the piston 23 is moved from the initial position P1 to the sealed position P2 is larger than a distance L1 that the piston 23 shown in FIG. 3 is moved from the initial position P1 to the sealed position P2. Therefore, after the position of the valve 30 has been adjusted, the idle stroke of the lever 21 is increased, and thus the lever 21 is required to be pulled a more stroke for feeling the change of the operating feeling.

In this embodiment, since the valve 30 is movably disposed on the casing 11 and sticks out of the bottom surface 1121 of the hydraulic chamber 112 so as to be partially located in the hydraulic chamber 112, or since the valve 30 is rotatably and linearly movably disposed on the main body 10 and has a portion thereof located in the hydraulic chamber 112, and the rotation axis A1 of the valve 30 is parallel to the movement direction of the piston 23, the valve 30 is movable relative to the main body 10 so as to adjust the distance between the initial position P1 and the sealed position P2 of the piston 23. Therefore, the bicycle brake lever 1 can have a simple structure configuration for allowing users to adjust the idle stroke of the lever 21 to meet their requirements.

In addition, the diameter of the valve 30 gradually increases from one side of the tapered surface 32 located closer to the end surface 33 towards another side of the tapered surface 32 located closer to the outer annular surface 31, and the diameter D1 of the valve 30 at the end surface 33 is smaller than the diameter D3 of the inner edge 41 of the sealing ring 40 which is not deformed. Therefore, when the end surface 33 of the valve 30 just enters into the through hole 42 of the sealing ring 40, and the outer annular surface 31 of the valve 30 has not pressed against the sealing ring 40 yet, the hydraulic chamber 112 is still in fluid communication with the storage chamber 111. Moreover, the tapered surface 32 of the valve 30 can help the valve 30 to smoothly enter into the through hole 42 of the sealing ring 40 during the movement of the piston 23 for clamping the sealing ring 40 between the piston 23 and the valve 30. However, in some other embodiments, the valve may not have the tapered surface.

In this embodiment, no matter the piston 23 is in the initial position P1 or the sealed position P2, a part of the valve 30 is inserted into the guide portion 2341 of the inner channel 234 of the piston 23, which can guide the movements of the valve 30 and the piston 23. In some other embodiments, the valve may be inserted into the guide portion when only in the sealed position.

Note that the sealing ring 40 is optional. In some other embodiments, the bicycle brake lever may not have the sealing ring. In such a case, the inner channel of the piston may be modified to have two portions with difference widths. When the piston is in the sealed position, the valve blocks the inner channel at the connection place of the two portions of the inner channel for disconnecting the storage chamber from the hydraulic chamber.

Note that the knob 50 is optional. In some other embodiments, the bicycle brake lever may not have the knob. In such a configuration, by directly rotating the extension portion of the valve sticking out of the outer surface of the main body, the valve can be moved linearly.

Furthermore, in another embodiment, the valve may not have the extension portion sticking out of the outer surface of the casing. In such a configuration, the valve may have a tool hole (e.g., a hexagonal-shaped hole) at an end thereof located opposite to the end surface, and the valve can be rotated to move linearly by using a tool (e.g., a hex key).

Note that two opposite ends of the mount hole 115 are not restricted to being respectively connected to the outer surface 116 of the casing 11 and the bottom surface 1121 of the hydraulic chamber 112. In some other embodiments, the mount hole may be merely connected to the bottom surface of the hydraulic chamber.

In this embodiment, the valve 30 is rotatable and linearly movable relative to the main body 10, but the disclosure is not limited thereto; in some other embodiments, the valve may be merely movable linearly relative to the main body.

Figure 9:
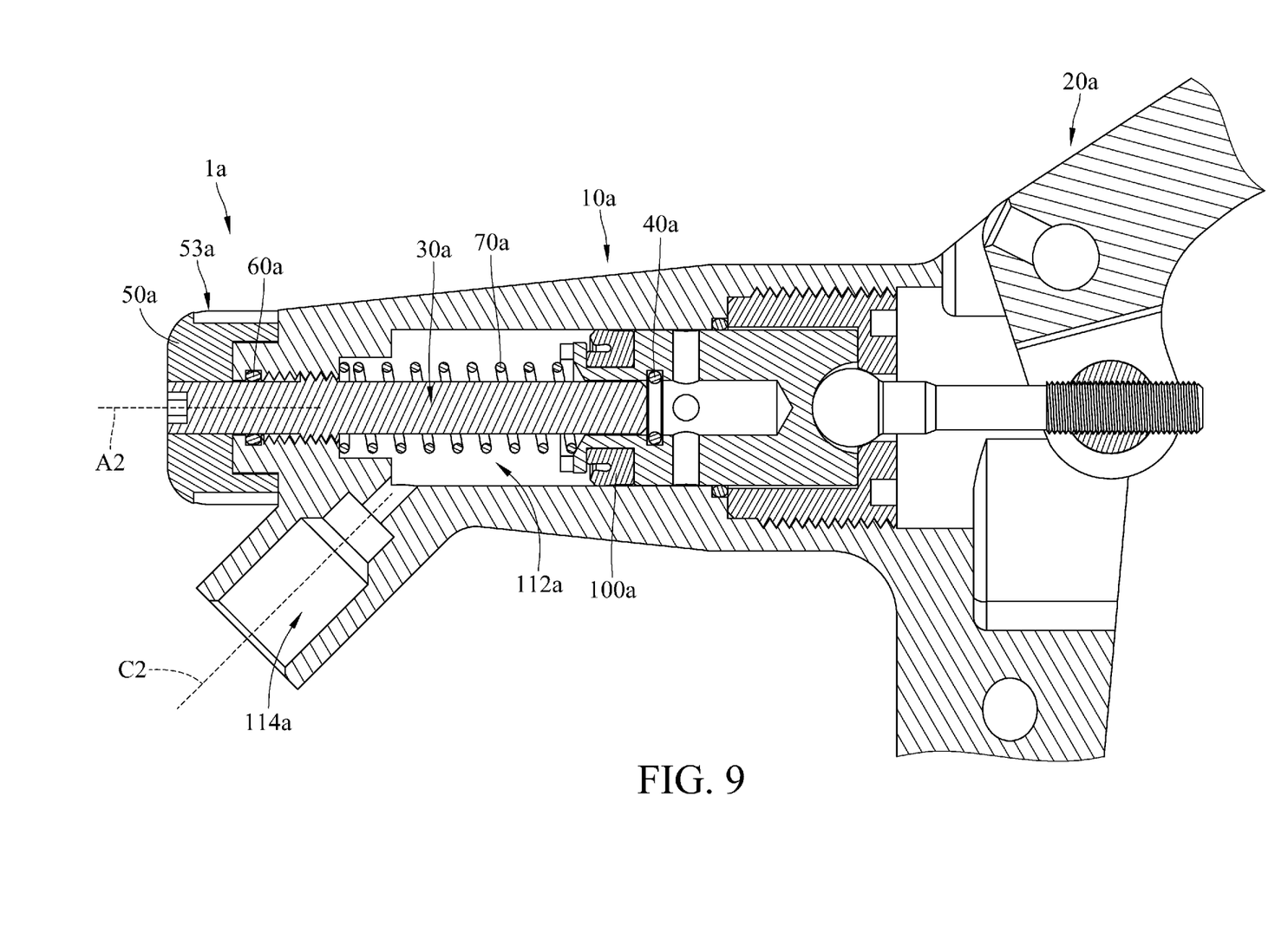
FIG. 9 is a partial cross-sectional view of a bicycle brake lever according to a second embodiment of the disclosure.
Figure 10:
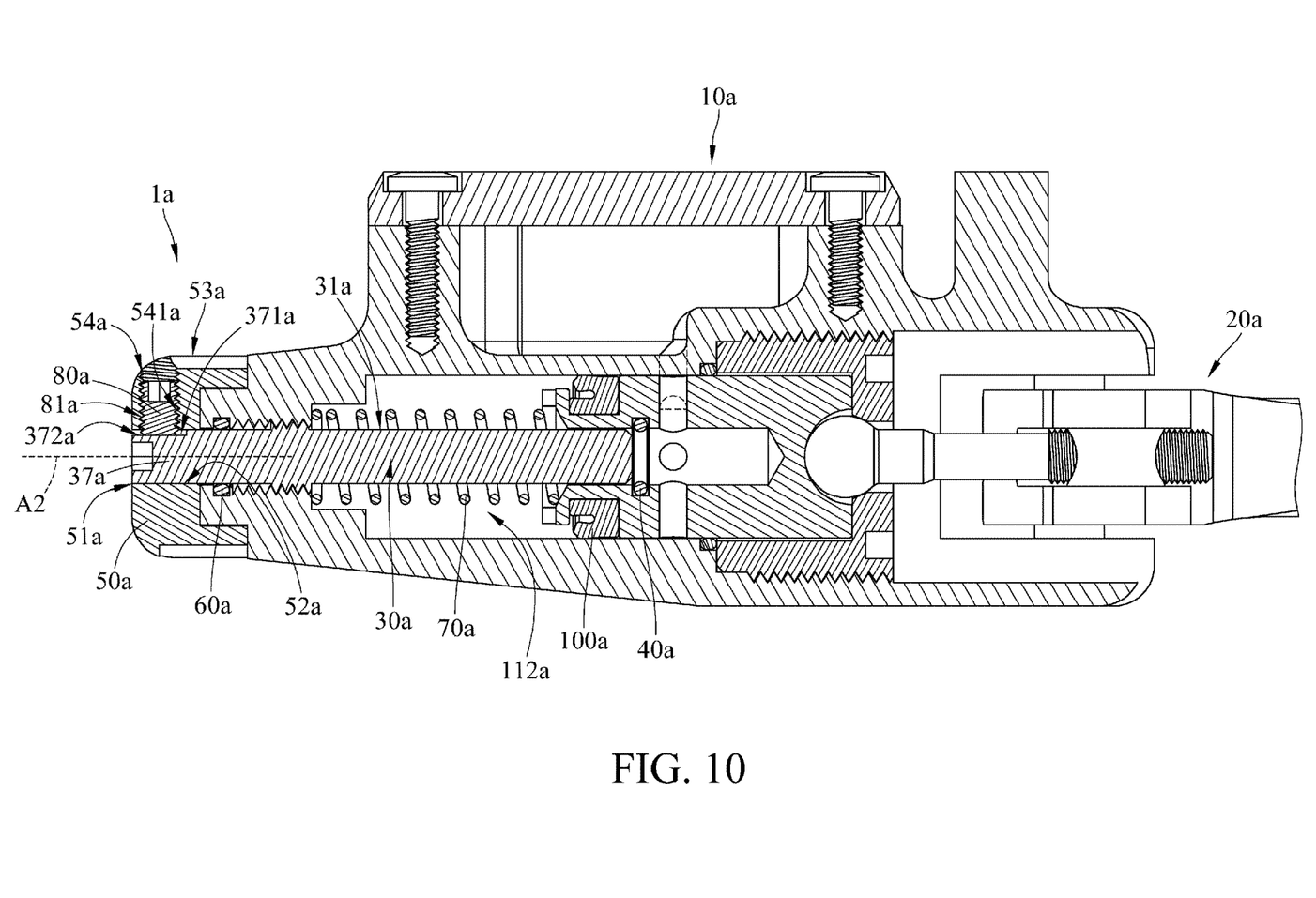
FIG. 10 is another partial cross-sectional view of the bicycle brake lever in FIG. 9.

Then, refer to FIGS. 9 and 10, where FIG. 9 is a partial cross-sectional view of a bicycle brake lever 1a according to a second embodiment of the disclosure, and FIG. 10 is another partial cross-sectional view of the bicycle brake lever 1a in FIG. 9.

In this embodiment, the bicycle brake lever 1a also includes a main body 10a, a brake assembly 20a, a valve 30a, a sealing ring 40a, a knob 50a, a sealing ring 60a, an elastic component 70a, and a sealing sleeve 100a. The structures of the brake assembly 20a, the sealing ring 40a, the sealing ring 60a, the elastic component 70a and the sealing sleeve 100a of the bicycle brake lever 1a are the same as those of the brake assembly 20, the sealing ring 40, the sealing ring 60, the elastic component 70 and the sealing sleeve 100 of the bicycle brake lever 1 as described in the previous embodiment with reference to FIGS. 1 to 8, and the relative position and the connection relationship among the main body 10a, the brake assembly 20a, the valve 30a, the sealing ring 40a, the knob 50a, the sealing ring 60a, the elastic component 70a and the sealing sleeve 100a of the bicycle brake lever 1a are substantially the same as those of the main body 10, the brake assembly 20, the valve 30, the sealing ring 40, the knob 50, the sealing ring 60, the elastic component 70 and the sealing sleeve 100 of the bicycle brake lever 1 as described in the previous embodiment with reference to FIGS. 1 to 8. Therefore, the part of the bicycle brake lever 1a which is the same as that of the bicycle brake lever 1 as described in the previous embodiment with reference to FIGS. 1 to 8 will not be described hereinafter. The differences between the bicycle brake lever 1a and the bicycle brake lever 1 in the previous embodiment with reference to FIGS. 1 to 8 are mainly the position of the oil outlet of the main body, the structure of the knob and the structure of the knob, and the following paragraphs merely introduce them.

In this embodiment, the oil outlet 114a of the main body 10a of the bicycle brake lever 1a extends from a lateral side of the hydraulic chamber 112a towards the handlebar (now shown) instead of extending from a bottom side of the hydraulic chamber 112a towards the ground, and the central line C2 of the oil outlet 114a is not perpendicular to the rotation axis A2 of the knob 50a; that is, the oil outlet 114a obliquely extends from the lateral side of the hydraulic chamber 112a.

In addition, in this embodiment, the knob 50a further has an outer annular surface 53a and a side hole 54a. Two opposite ends of the side hole 54a are respectively connected to the outer annular surface 53a and the inner surface 52a of the fixing hole 51a so as to be connected to the fixing hole 51a, and an extension direction of the side hole 54a is, for example, perpendicular to that of the fixing hole 51a. The side hole 54a has a thread structure 541a therein. The bicycle brake lever 1a further includes a fastener 80a. The fastener 80a has a thread structure 81a. The extension portion 37a of the valve 30a has a recess 371a recessed from the outer annular surface 31a of the valve 30a, and a bottom surface 372a of the recess 371a is, for example, a flat surface. The thread structure 81a of fastener 80a is engaged with the thread structure 541a of the side hole 54a, and the fastener 80a presses against the bottom surface 372a of the recess 371a of the extension portion 37a, such that the fastener 80a fixes the valve 30a to the knob 50a.

Figure 11:
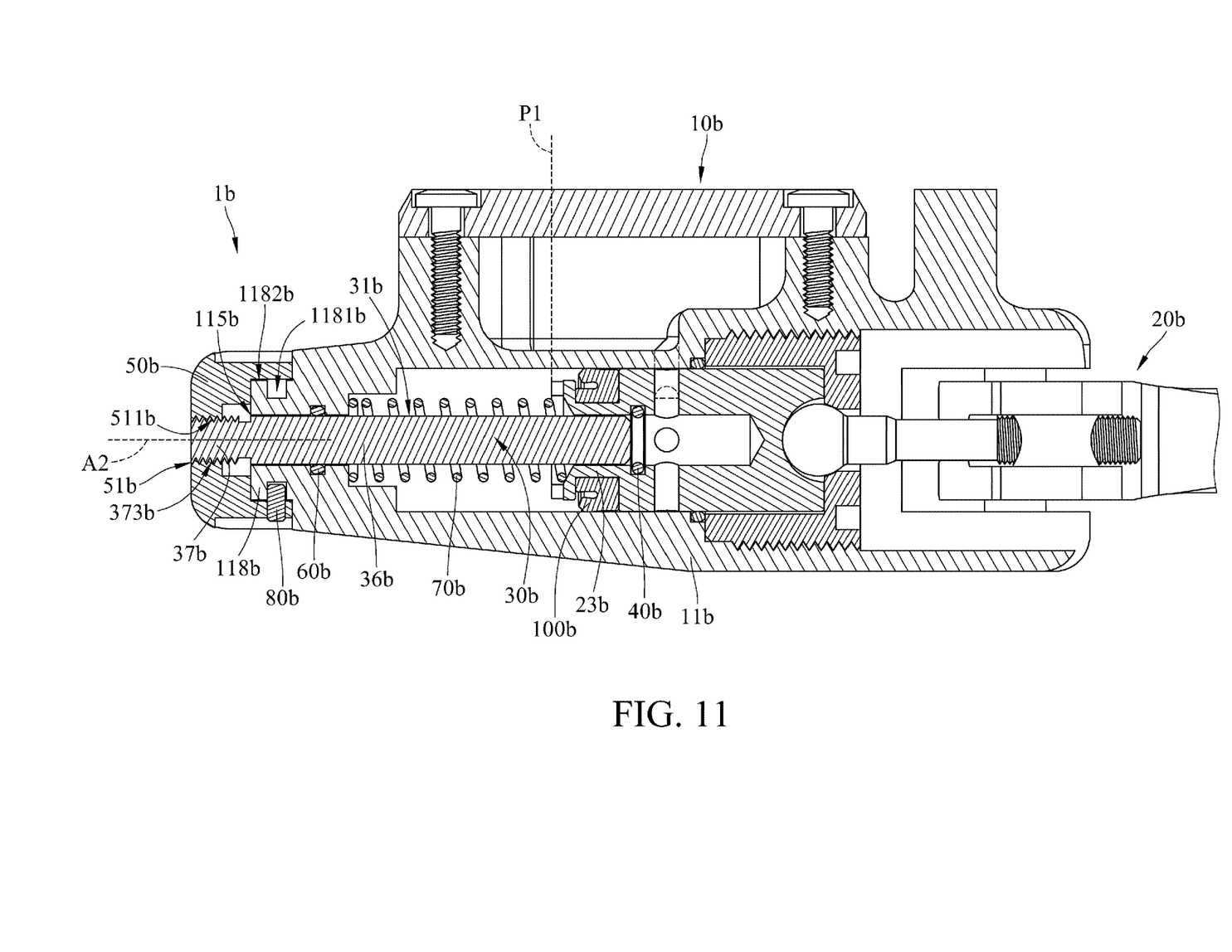
FIG. 11 is a partial cross-sectional view of a bicycle brake lever according to a third embodiment of the disclosure.
Figure 12:
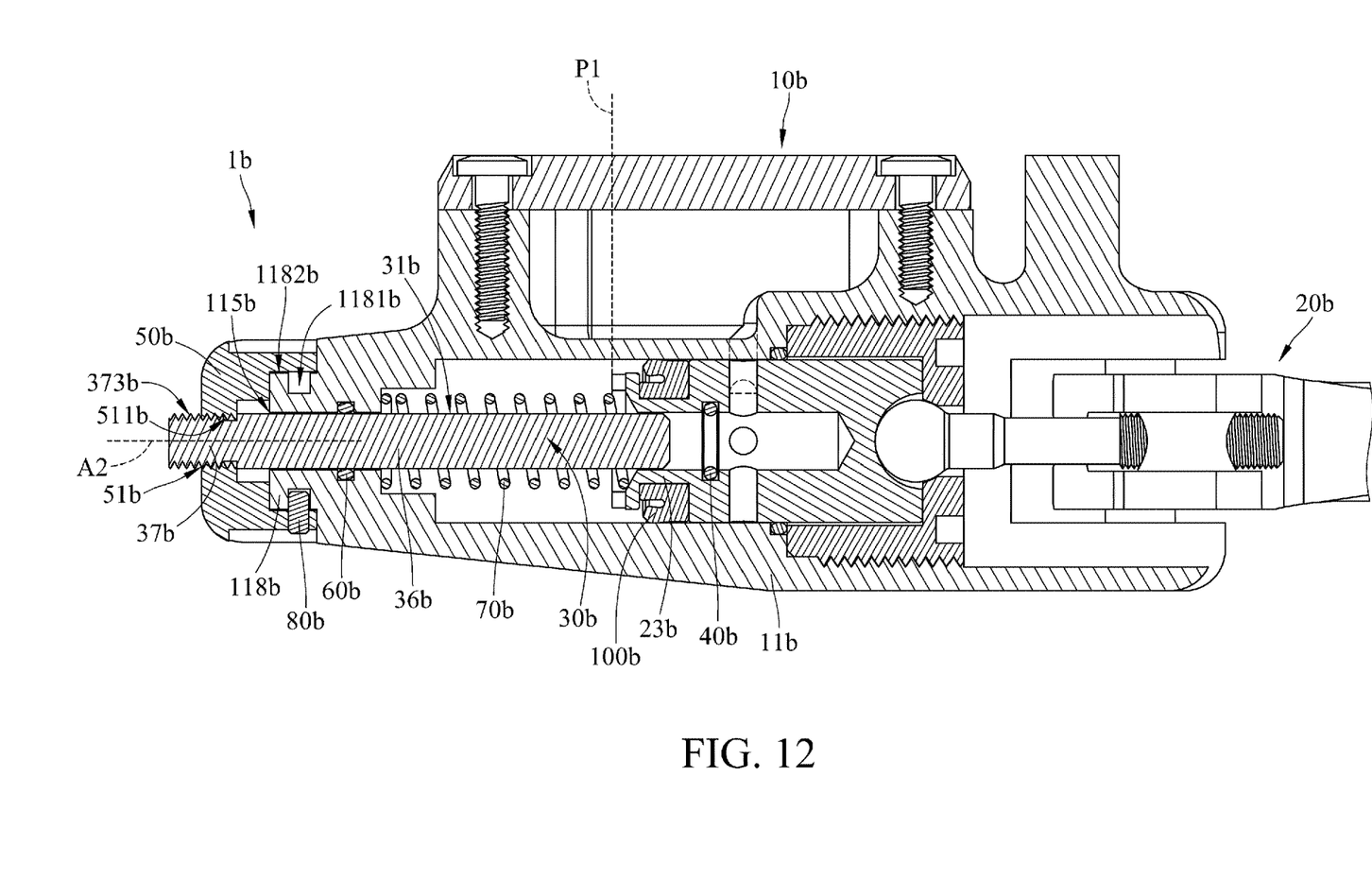
FIG. 12 is a partial cross-sectional view of the bicycle brake lever in FIG. 11 when a position of a valve has been adjusted.

Then, refer to FIGS. 11 and 12, where FIG. 11 is a partial cross-sectional view of a bicycle brake lever 1b according to a third embodiment of the disclosure, and FIG. 12 is a partial cross-sectional view of the bicycle brake lever 1b in FIG. 11 when a position of a valve 30b has been adjusted.

In this embodiment, the bicycle brake lever 1b also includes a main body 10b, a brake assembly 20b, a valve 30b, a sealing ring 40b, a knob 50b, a sealing ring 60b, an elastic component 70b, and a sealing sleeve 100b. The structures of the brake assembly 20b, the sealing ring 40b, the sealing ring 60b, the elastic component 70b and the sealing sleeve 100b of the bicycle brake lever 1b are the same as those of the brake assembly 20a, the sealing ring 40a, the sealing ring 60a, the elastic component 70a and the sealing sleeve 100a of the bicycle brake lever 1a as described in the previous embodiment with reference to FIGS. 9 and 10, and the relative position and the connection relationship among the main body 10b, the brake assembly 20b, the valve 30b, the sealing ring 40b, the knob 50b, the sealing ring 60b, the elastic component 70b and the sealing sleeve 100b of the bicycle brake lever 1b are substantially the same as those of the main body 10a, the brake assembly 20a, the valve 30a, the sealing ring 40a, the knob 50a, the sealing ring 60a, the elastic component 70a and the sealing sleeve 100a of the bicycle brake lever 1a as described in the previous embodiment with reference to FIGS. 9 and 10. Therefore, the part of the bicycle brake lever 1b which is the same as that of the bicycle brake lever 1a as described in the previous embodiment with reference to FIGS. 9 and 10 will not be described hereinafter. The differences between the bicycle brake lever 1b and the bicycle brake lever 1a in the previous embodiment with reference to FIGS. 9 and 10 are mainly the structures of the knob 50b and the valve 30b, and the following paragraphs merely introduce them.

In this embodiment, as shown in FIGS. 11 and 12, the knob 50b is rotatable relative to the valve 30b to merely drive the valve 30b to move linearly so as to adjust a distance between the initial position P1 (as shown in FIGS. 11 and 12) and the sealed position (as shown in FIGS. 5 and 8) of the piston 23b.

Specifically, the mount hole 115b of the casing 11b has no thread structure therein, and the connection portion 36b of the valve 30b has no thread structure thereon. The fixing hole 51b of the knob 50b has a thread structure 511b therein, and the extension portion 37b of the valve 30b has a thread structure 373b thereon. The thread structure 511b of the fixing hole 51b of the knob 50b is engaged with the thread structure 373b of the extension portion 37b of the valve 30b. In this embodiment, the valve 30b is merely movable linearly but not rotatable relative to the casing 11b. In order to achieve this configuration, for example, there may be guide grooves and guide protrusions in the mount hole 115b of the casing 11b and on the portion of valve 30b in the mount hole 115b, and the guide grooves and the guide protrusions mate each other and extend along an axial direction of the valve 30b. As a result, when the knob 50b is rotated relative to the main body 10b, the valve 30b is not rotated along with the knob 50b due to the limitation by the guide grooves and the guide protrusions that mate each other. Therefore, during the rotation of the knob 50b, the knob 50b drives the valve 30b to merely move linearly relative to the main body 10b via the thread structures 511b and 373b.

In this embodiment, the bicycle brake lever 1b further includes a fastener 80b, and the protrusion portion 118b of the casing 11b has an annular positioning groove 1181b. The annular positioning groove 1181b is recessed from an outer surface 1182b of the protrusion portion 118b facing away from the mount hole 115b. The knob 50b is rotatably sleeved on the protrusion portion 118b, and the fastener 80b is disposed through the knob 50b and inserted into the annular positioning groove 1181b for preventing the knob 50b from being detached from the casing 11b.

According to the bicycle brake levers as discussed in the above embodiments, since the valve is movably disposed on the casing and sticks out of the bottom surface of the hydraulic chamber so as to be partially located in the hydraulic chamber, or since the valve is rotatably and linearly movably disposed on the main body and has a portion located in the hydraulic chamber, and the rotation axis of the valve is parallel to the movement direction of the piston, the valve is movable relative to the main body so as to adjust the distance between the initial position and the sealed position of the piston. Therefore, the bicycle brake lever can have a simple structure configuration for allowing users to adjust the idle stroke of the lever to meet their requirements.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A bicycle brake lever, comprising:
   a main body, comprising a casing and a cover, wherein the casing has a storage chamber and a hydraulic chamber, the hydraulic chamber has a bottom surface, the cover is mounted on the casing, and the bottom surface of the hydraulic chamber faces the cover;
   a brake assembly, comprising a lever, a link, and a piston, wherein the lever is pivotally disposed on the casing, two opposite ends of the link are respectively connected to the lever and the piston, the link is disposed through the cover, the piston is movably located in the hydraulic chamber so as to be movable between an initial position and a sealed position, and the piston has an inner channel in fluid communication with the storage chamber; and
   a valve, movably disposed on the casing, wherein the valve sticks out of the bottom surface so as to be partially located in the hydraulic chamber;
   wherein when the piston is in the initial position, the hydraulic chamber is in fluid communication with the storage chamber via the inner channel of the piston; when the piston is in the sealed position, the valve blocks the inner channel of the piston, such that the hydraulic chamber is not in fluid communication with the storage chamber;
   wherein the valve is movable relative to the main body so as to adjust a distance between the initial position and the sealed position of the piston.

2. The bicycle brake lever according to claim 1, wherein the casing has a mount hole, one end of the mount hole is connected to the bottom surface, an inner surface of the mount hole has a thread structure, the valve has a thread structure, the thread structure of the valve is engaged with the thread structure of the inner surface of the mount hole, and the valve is rotatable so as to be linearly movable relative to the main body.

3. The bicycle brake lever according to claim 2, wherein a rotation axis of the valve is parallel to a movement direction of the piston.

4. The bicycle brake lever according to claim 2, wherein two opposite ends of the mount hole are respectively connected to the bottom surface and an outer surface of the casing.

5. The bicycle brake lever according to claim 4, further comprising a knob, wherein the valve further has an extension portion, the extension portion sticks out of the outer surface of the casing, the knob has a fixing hole, the extension portion of the valve is fixed into the fixing hole, and the knob is rotatable so as to rotate the valve and linearly move the valve relative to the main body.

6. The bicycle brake lever according to claim 5, further comprising a fastener, wherein the knob further has an outer annular surface and a side hole, the fixing hole of the knob is recessed along a rotation axis of the knob, two opposite ends of the side hole are respectively connected to the outer annular surface of the knob and an inner surface of the fixing hole, the extension portion of the valve has a recess, the fastener is mounted into the side hole, an end of the fastener presses against a bottom surface of the recess so as to fix the valve into the fixing hole of the knob.

7. The bicycle brake lever according to claim 4, further comprising a sealing ring, wherein the sealing ring is located in the mount hole and clamped between a part of the casing and the valve.

8. The bicycle brake lever according to claim 1, further comprising a sealing ring, wherein the sealing ring is located in the inner channel of the piston, the valve has an outer annular surface; when the piston is in the initial position, the outer annular surface of the valve is separated from the sealing ring; when the piston is in the sealed position, the sealing ring is clamped between a part of the piston and the outer annular surface of the valve.

9. The bicycle brake lever according to claim 8, wherein the inner channel of the piston has a guide portion and at least one connection portion in fluid communication with each other, the guide portion extends from a surface of the piston facing the bottom surface along an axial direction of the piston, the at least one connection portion extends from the guide portion to an annular surface of the piston, the guide portion is in fluid communication with the storage chamber via the at least one connection portion, the sealing ring is located in the guide portion, and the valve is partially located in the guide portion.

10. The bicycle brake lever according to claim 8, wherein the valve further has an end surface and a tapered surface, the end surface is connected to the outer annular surface via the tapered surface, a diameter of the valve gradually increases from one side of the tapered surface located closer to the end surface towards another side of the tapered surface located closer to the outer annular surface.

11. The bicycle brake lever according to claim 1, further comprising a knob, wherein the casing has a mount hole, two opposite ends of the mount hole are respectively connected to the bottom surface and an outer surface of the casing, the valve has an extension portion which sticks out of the outer surface of the casing, the knob is rotatably disposed on the casing and connected to the extension portion of the valve, a rotation axis of the knob is parallel to a movement direction of the piston, the knob is rotatable relative to the main body so as to linearly move the valve to adjust the distance between the initial position and the sealed position of the piston.

12. The bicycle brake lever according to claim 11, wherein the knob is rotatable relative to the valve so as to merely linearly move the valve to adjust the distance between the initial position and the sealed position of the piston.

13. The bicycle brake lever according to claim 12, wherein the knob has a fixing hole, the fixing hole of the knob has a thread structure, the extension portion of the valve has a thread structure, and the thread structure of the fixing hole of the knob is engaged with the thread structure of the extension portion of the valve.

14. The bicycle brake lever according to claim 11, further comprising a fastener, wherein the casing has a protrusion portion, the outer surface and a part of the mount hole of the casing are located at the protrusion portion, the protrusion portion has an annular positioning groove recessed from an outer surface of the protrusion portion facing away from the mount hole, the knob is rotatably sleeved on the protrusion portion, and the fastener is disposed through the knob and inserted into the annular positioning groove.

15. A bicycle brake lever, comprising:
a main body, having a storage chamber and a hydraulic chamber;
a brake assembly, comprising a lever, a link, and a piston, wherein the lever is pivotally disposed on the main body, two opposite ends of the link are respectively connected to the lever and the piston, the piston is movably located in the hydraulic chamber so as to be movable between an initial position and a sealed position, and the piston has an inner channel in fluid communication with the storage chamber;
a valve, linearly and movably disposed on the main body and partially located in the hydraulic chamber; and
a knob, rotatably disposed on the main body and connected to the valve, wherein a rotation axis of the knob is parallel to a movement direction of the piston;
wherein when the piston is in the initial position, the hydraulic chamber is in fluid communication with the storage chamber via the inner channel of the piston; when the piston is in the sealed position, the valve blocks the inner channel of the piston, such that the hydraulic chamber is not in fluid communication with the storage chamber;
wherein the knob is rotatable relative to the main body so as to linearly move the valve to adjust a distance between the initial position and the sealed position of the piston.

16. A bicycle brake lever, comprising:
a main body, comprising a casing and a cover, wherein the casing has a storage chamber and a hydraulic chamber, the hydraulic chamber has a bottom surface, the cover is mounted on the casing, and the bottom surface of the hydraulic chamber faces the cover;
a brake assembly, comprising a lever, a link, and a piston, wherein the lever is pivotally disposed on the casing, two opposite ends of the link are respectively connected to the lever and the piston, the link is disposed through the cover, the piston is movably located in the hydraulic chamber so as to be movable between an initial position and a sealed position, and the piston has an inner channel in fluid communication with the storage chamber; and
a valve, disposed on the casing and having a guide portion located in the hydraulic chamber, wherein the piston is movable between the initial position and the sealed position via a guidance of the guide portion of the valve;
wherein when the piston is in the initial position, the hydraulic chamber is in fluid communication with the storage chamber via the inner channel of the piston; when the piston is in the sealed position, the valve blocks the inner channel of the piston, such that the hydraulic chamber is not in fluid communication with the storage chamber.

17. The bicycle brake lever according to claim 16, further comprising a knob, wherein the valve further has a connection portion, the connection portion connects the knob with the guide portion, the guide portion is located in the inner channel of the piston, and the connection portion is located outside the inner channel of the piston.

* * * * *